(12) United States Patent
Kerner et al.

(10) Patent No.: US 7,031,799 B2
(45) Date of Patent: Apr. 18, 2006

(54) CONTROL STRUCTURE FOR THE ACTIVE DAMPING OF LOW-FREQUENCY OSCILLATIONS IN NUMERICALLY CONTROLLED MACHINE TOOLS

(75) Inventors: Norbert Kerner, Traunwalchen (DE); Hans Lengenfelder, Mühldorf (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 0 days.

(21) Appl. No.: 10/757,376

(22) Filed: Jan. 14, 2004

(65) Prior Publication Data

US 2004/0172171 A1 Sep. 2, 2004

(30) Foreign Application Priority Data

Jan. 18, 2003 (DE) ................. 103 01 765

(51) Int. Cl.
*G06F 19/00* (2006.01)
*G05B 13/00* (2006.01)

(52) U.S. Cl. ..................... 700/175; 700/280

(58) Field of Classification Search .......... 700/174, 700/280, 71, 35, 38, 41, 42, 54, 55, 170, 700/176, 188, 175; 409/141; 82/1, 11, 904; 318/611; 702/56; 340/680, 683
See application file for complete search history.

(56) References Cited

U.S. PATENT DOCUMENTS

| | | | |
|---|---|---|---|
| 6,216,047 B1* | 4/2001 | Goto | 700/28 |
| 6,296,093 B1* | 10/2001 | Norris et al. | 188/378 |
| 2002/0099475 A1 | 7/2002 | Spangler et al. | |
| 2002/0191661 A1 | 12/2002 | Morton et al. | |
| 2003/0040818 A1 | 2/2003 | Pletner et al. | |
| 2004/0022292 A1 | 2/2004 | Morton et al. | |
| 2004/0037338 A1 | 2/2004 | Morton et al. | |

FOREIGN PATENT DOCUMENTS

| | | |
|---|---|---|
| DE | 196 34 923 A1 | 3/1998 |
| WO | WO 01/23967 A1 | 4/2001 |
| WO | WO 02/077484 A2 | 10/2002 |

* cited by examiner

*Primary Examiner*—Leo Picard
*Assistant Examiner*—Steven R. Garland
(74) *Attorney, Agent, or Firm*—Brinks Hofer Gilson & Lione

(57) ABSTRACT

A control structure for the active damping of low-frequency oscillations in numerically-controlled machine tools. The control structure includes an rpm regulator having a proportional component and an integral component. The control structure further includes an active damping element that forms a low-frequency correction signal, which is phase-shifted with respect to an interfering low-frequency oscillation and free of d.c. components, and a summing point that is upstream or downstream of the integral component and receives the low-frequency correction signal.

18 Claims, 3 Drawing Sheets

CONTROL STRUCTURE FOR THE ACTIVE DAMPING OF LOW-FREQUENCY OSCILLATIONS IN NUMERICALLY CONTROLLED MACHINE TOOLS

Applicants claim, under 35 U.S.C. §119, the benefit of priority of the filing date of Jan. 18, 2003 of a German patent application, copy attached, Serial Number 103 01 765.8, filed on the aforementioned date, the entire contents of which is incorporated herein by reference.

BACKGROUND OF THE INVENTION

1. Field of the Invention

The present invention relates to a control structure for the active damping of low-frequency oscillations in numerically-controlled machine tools, having an rpm regulator with a proportional component and an integral component.

2. Discussion of Related Art

Such oscillations considerably affect the surface quality of a treated work piece.

The numerical control of a machine tool controls the processing of a work piece by a parts program, in which an exact treatment process is fixed in the most different treatment cycles. In the course of this, a tool is required to follow a predetermined track as exactly as possible, so that the shape of the finished work piece corresponds to the preset conditions. To this end it is necessary to appropriately control the various shafts of the machine tool with their respective rotary or linear drive mechanisms. In order to be able to maintain a predetermined treatment track, control structures are employed which, in a position regulating device, calculate a nominal speed (for linear drive mechanisms) or nominal rpm (for rotary drive mechanisms) from the respective predetermined nominal position and the actual position of the tool, by which it is intended to correct a possible position deviation. The difference between the nominal rpm and the actual rpm is converted in an rpm regulator into a nominal current for the drive mechanism which, via the motor constant of the drive mechanism, also corresponds to a nominal torque. After a comparison with the actual current, a nominal voltage is determined from this nominal current by regulation in a current regulator and is converted in the drive mechanism amplifier and applied to the phases of the motor. Suitable measuring systems check the actual position of the work piece, from which the actual rpm can be derived. Current sensors in the supply lines to the motor detect the actual current.

The connection between the drive mechanism and the tool is never completely rigid, instead it contains elastic components, which are therefore capable of oscillation. Thus, mechanical resonance frequencies occur, which can lead to undesired oscillations in case of an adverse parameterization of the control structure and/or reduced internal damping of the elastic components. Because of the demand for increasingly greater bandwidths of the control structures, primarily realized by high amplifier factors in the position control circuit, such low-frequency resonance frequencies are also amplified and are superimposed on the tool track. Low-frequency oscillations in the range of up to 50 Hz are clearly visible in the form of an undesired surface waviness of the treated work piece.

A negative phase angle rotation has particularly negative effects in the formation of such resonance oscillations, such as is created in particular by the delays in the control system during the cooperation with the integral component of the rpm regulator. The integral portion can be reduced by reducing the corresponding amplification factor, and the resonance oscillation weakened in the process, but at the same time the rigidity of the machine tool and the quality of the interference removal are also reduced.

Therefore WO 01/23967 A1 describes the parameterization of a regulator system, in which the feedback of the actual rpm to the nominal rpm upstream of the rpm regulator is split onto two summing points, and wherein a reference model in the form of a proportional component with second order delay (PT2 member) is switched into the branch upstream of the integrating element of the rpm regulator. This reference model is matched to the behavior of the closed control circuit without an integral component in the rpm regulator, so that the disadvantageous influence of the integral component does not appear in the guidance behavior of the rpm regulator. This disadvantageous influence is particularly strong because of the negative phase shift by 90 degrees occurring in the integral component. However, only resonance frequencies above approximately 20 Hz can be damped with this arrangement, and in connection with large machines with several resonances this circuit can only positively act on the respectively highest resonance frequency, while lower resonance frequencies possibly are even negatively affected.

OBJECT AND SUMMARY OF THE INVENTION

It is therefore an object of the present invention to create a control structure which is able in particular to actively damp low resonances in numerically-controlled machine tools.

This object is attained by a control structure for the active damping of low-frequency oscillations in numerically-controlled machine tools. The control structure includes an rpm regulator having a proportional component and an integral component. The control structure further includes an active damping element that forms a low-frequency correction signal, which is phase-shifted with respect to an interfering low-frequency oscillation and free of d.c. components, and a summing point that is upstream or downstream of the integral component and receives the low-frequency correction signal.

A control structure for the active damping of low-frequency oscillations in numerically-controlled machine tools is proposed, wherein in a control structure with an rpm regulator with a proportional component and integral component a correction signal, which is phase-shifted with respect to the interfering low-frequency oscillation and is free of d.c. components, is switched to a summing point upstream or downstream of the integral component. This correction signal is formed in an active damping element.

Here, a possible embodiment of the present invention assumes that the interfering low-frequency oscillation is also superimposed on the nominal rpm at the output of the position regulator, since the position regulator is supplied with the difference between nominal position value and actual position value, and the interfering oscillation in fact finds expression in an oscillating actual position value.

If therefore the nominal rpm is freed of its d.c. components and the phase relation is correctly set, the correction signal obtained in this way is suitable, when switched to the integral component of the rpm regulator, for the active damping or cancellation of the interfering low-frequency oscillation.

An advantage of the present invention lies in that, once a damping element has been parameterized, it operates very stably, even if a shift of the interfering resonance frequency results, for example by load changes. This of course also means that the parameterization itself can be simply performed.

Further advantages, as well as details, of the present invention result from the following description of preferred embodiments by the drawings.

DETAILED DESCRIPTION OF THE PREFERRED EMBODIMENTS

Figure 1:
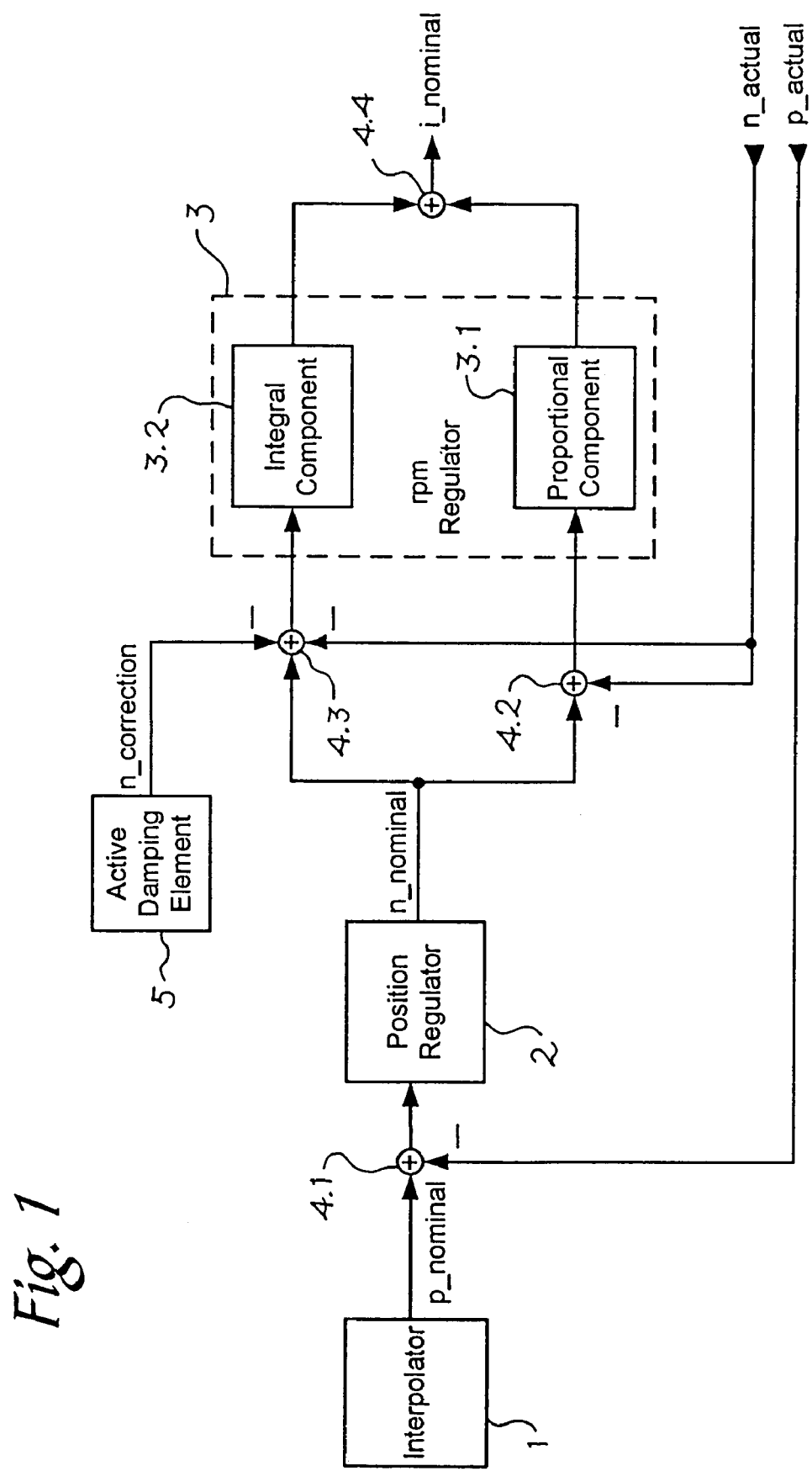
FIG. 1 shows an embodiment of a control structure with active damping of low-frequency oscillations in accordance with the present invention.

FIG. 1 shows a portion of the control structure of a numerically-controlled machine tool. An interpolator 1 calculates short segment portions from the data of a parts program, whose end points are put out as the nominal position value p_nominal. The actual position value p_actual is subtracted from this nominal position value p_nominal at a summing point 4.1. The position difference obtained in this way is supplied to the position regulator 2 which, as a function of the position difference and the set position regulator amplification, forms a nominal rpm n_nominal, with which the position difference is intended to be compensated. For example, the position regulator 2 can be embodied as a simple proportional regulator, which multiplies the position difference by a factor and puts it out as the nominal rpm n_nominal.

The difference between the nominal rpm n_nominal and the actual rpm $n_{13}$ actual is formed at separate summation points 4.2 and 4.3, and this deviation of the rpm is put out to the proportional component 3.1, or the integral component 3.2 of the rpm or speed regulator 3. A nominal current i_nominal is available at the output of the rpm regulator 3 and includes the sum of the outputs of the proportional component 3.1 and the integral component 3.2 of the rpm regulator 3. Multiplied by the motor constant the nominal current_nominal corresponds to a nominal torque converted into a nominal voltage in a current regulator (from here on out the control circuit is no longer represented in the drawing figure). A control circuit is also used for this, which is supplied with an actual current value picked up by current sensors at the motor. An output amplifier generates the requested voltage, for example by controlling the motor phases by pulse width modulation (PWM). The resultant movement is then detected by position measuring systems, which provide the actual position value p actual and, derived from this, also the actual rpm n_actual.

If now a low-frequency mechanical resonance frequency is excited in the machine tool, the machine tool begins to oscillate. This oscillation is propagated via the actual position value p_actual into the control circuit. In the course of this, frequency-dependent different phase shifts and dampings or amplifications occur in the various elements of the control circuit. Here, the integral component 3.2 of the rpm regulator 3 provides a particularly large contribution to the negative phase shift. Therefore an active damping of an interfering low-frequency oscillation acts particularly effectively there. The idea on which the present invention is based rests on providing the integral component 3.2 of the rpm regulator 3 with a correction signal n_correction, which damps the undesired oscillation or even eliminates it. Represented in a simplified way, a signal free of d.c. components with the frequency of the undesired oscillation, but which is phase-shifted by approximately 180 degrees with respect to the latter, is required at the input of the integral component 3.2 of the rpm regulator 3. In this case the phase shift relates to the phase relation of the oscillation, which is coupled in via the nominal rpm n_nominal at the summation point 4.3 of the integral component 3.2 of the rpm regulator 3. But the actual phase shift required for optimal damping or elimination will slightly diverge from 180 degrees, since an amplification of the undesired oscillation also takes place via the proportional component 3.1. This and further interactions in the control circuit must be taken into consideration in the course of parameterization of the active damping element 5.

The task of the active damping element 5, not further represented in FIG. 1, initially includes making a suitable correction signal n_correction available, by which the described negative effects of the integral component 3.2 on the oscillation behavior can be combated. The distribution of the formation of the difference between the nominal rpm n_nominal and the actual rpm n_actual to the summation points 4.2 and 4.3 permits the specific influencing of the integral component 3.2 in an elegant manner.

Figure 2:
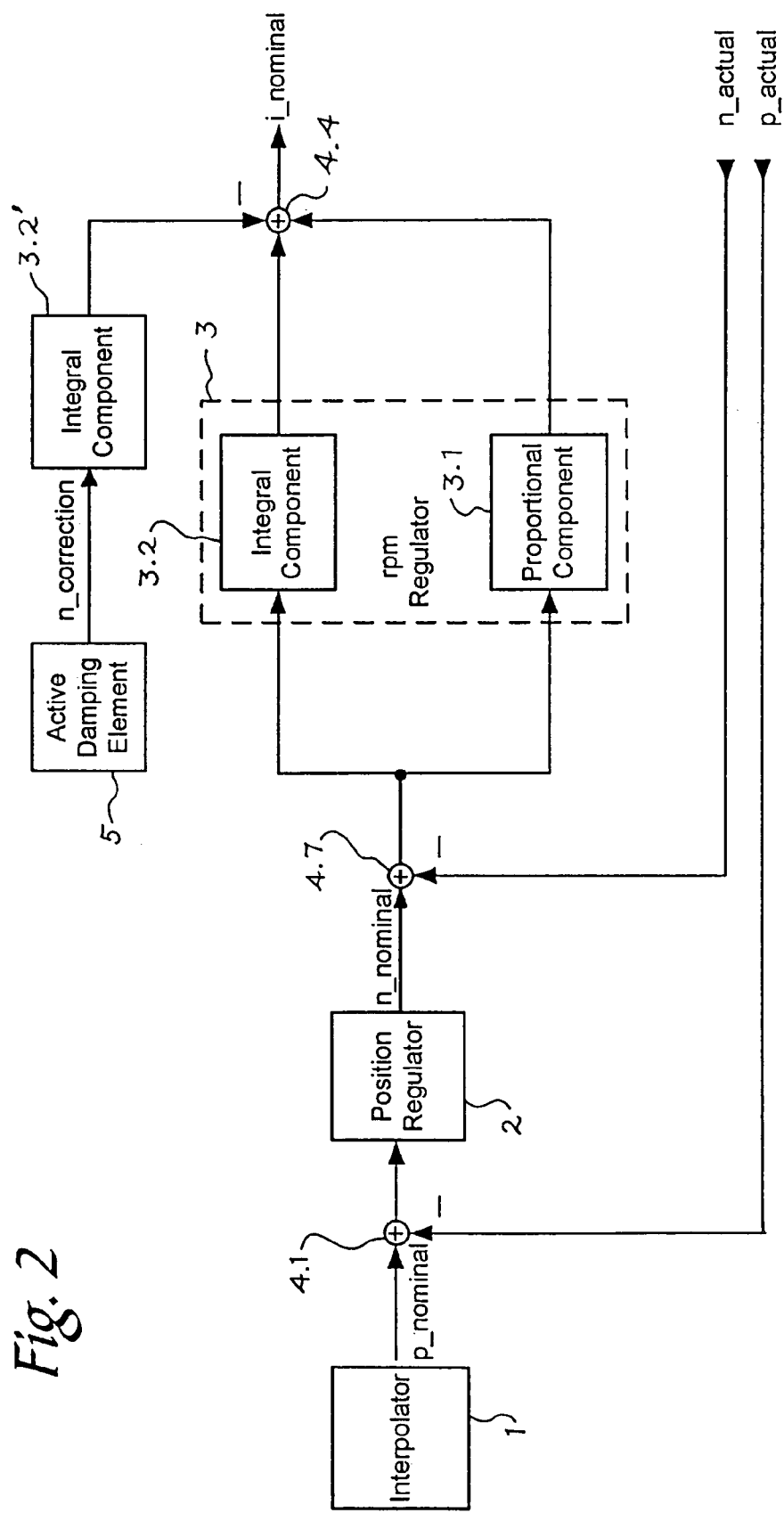
FIG. 2 shows a modification of the control structure in FIG. 1 which is equivalent in accordance with the block circuit algebra and in accordance with the present invention.

An alternative to the circuit in accordance with FIG. 1 which is equivalent in accordance with regulation technology, but more expensive, is represented in FIG. 2. Now the correction signal n_correction is coupled in at the summation point 4.4 not upstream of the integral component 3.2, but only downstream of the integral component 3.2. In accordance with the rules of block circuit algebra it is completely equivalent to the arrangement in accordance with FIG. 1 if an additional integral component 3.2' is inserted between the active damping element 5 and the summation point 4.4. In this case the integral component 3.2 and the additional integral component 3.2' must completely match each other which, at least in case of an analog realization, means a considerable outlay. Now the formation of the difference between the nominal rpm n_nominal and the actual rpm n_actual can take place at only a single summation point 4.7. Thus, there are two completely equivalent (and in the sense of the block circuit algebra actually identical) options of applying the correction signal n_correction.

Figure 3:
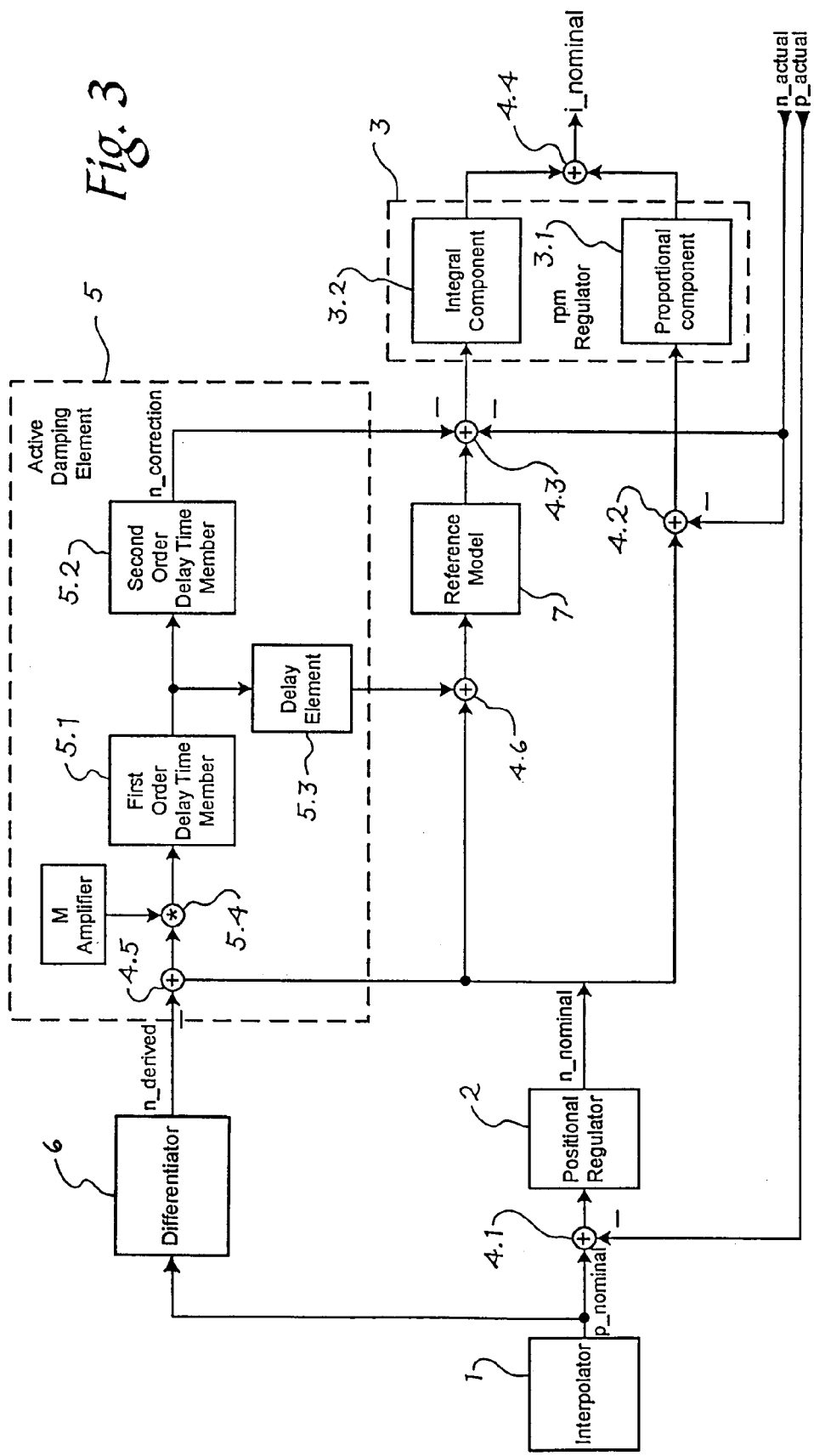
FIG. 3 shows a third embodiment of a control structure with active damping of low-frequency oscillations in accordance with the present invention.

FIG. 3 shows a possible embodiment of the present invention. Corresponding elements are identified the same as in FIG. 1, or FIG. 2, so that they and their linkages need not be explained again. The present embodiment is based on the realization that interfering low-frequency oscillations are also contained in the nominal rpm n_nominal of the position regulator 2. This fact can be used for producing the correction signal n_correction.

For eliminating the d.c. components of the nominal rpm n_nominal, the difference between a derived rpm n_derived and the nominal rpm n_nominal is produced at a summation point 4.5. In this case the derived rpm n_derived was produced in a differentiator 6, which differentiates the nominal position values p_nominal of the interpolator 1. This derived rpm n_derived does not contain any interfering resonance oscillation and can also be used for rpm pre-control. If the difference is formed at the summation point

4.5 in such a way that the derived rpm n_derived with a negative sign is switched in, a signal which is free to a great extent of d.c. components is obtained, whose phase relation corresponds to the oscillation of the nominal rpm.

An amplifier with an adjustable amplification factor M is located inside the active damping element 5. This is represented in FIG. 3 by a multiplication point 5.4, where the difference between the derived rpm n_derived and the nominal rpm n_nominal is multiplied by the factor M. This allows the continuous regulation of the active damping of the low-frequency oscillation. At M=0, the active damping element 5 is completely deactivated.

It is then additionally recommended to further reduce the low-frequency portion of the difference between the nominal rpm n_nominal and the derived rpm n_derived. This can be done with a differential element with a first order delay time (DT1) member 5.1, through which the difference between the derived rpm n_derived and the nominal rpm n_nominal is conducted. The signal, now free of d.c. components, is finally conducted to a second order delay time (PT2) member 5.2, which is tuned to the interfering resonance frequency. For stabilization, the output of the DT1 member 5.1 is supplied in a transverse branch via a delay element (PT1 member) 5.3 and a summing point 4.6 also to the branch of the nominal rpm n_nominal conducted to the integral component 3.2 of the rpm regulator 3.

The correction signal n_correction generated in the active damping element 5 therefore is a signal free of d.c. components and phase-shifted with respect to the interfering low-frequency oscillation and is additionally applied at the summing point 4.3 upstream of the integral component 3.2 of the rpm regulator. In this way the interfering resonance can be effectively suppressed.

For parameterizing the active damping element 5, the damping time constant T2 of the PT2 member 5.2 is selected to correspond to the resonance frequency Fres to be damped:

$$T2 = k/(2*\pi*Fres)$$

with a time constant displacement factor k, which in actual use swings between 0.8 and 1.0. The time constant displacement factor k permits the detuning of the PT2 element 5.2, which can bring advantages when parameterizing the control structure. Thus, for a resonance frequency of 10 Hz, a time constant T2 of 0.016 s (for k=1), for example, is obtained. For optimal damping of D=0.35, the result then is (from the equation D=T2/(2*T1) applicable to PT2 elements) for example a T1 time constant for the PT2 member 5.2 of $$T1 = T2/0.7$$

The time constant of the DT1 member 5.3 then should be clearly greater, for example approximately ten times that of T2, the time constant of the PT1 member should be less, for example approximately one-quarter of T2. The stated number values of course only provide an approximate order of magnitude for a special application case, the exact parameterization of the active damping element 5 will differ from one case to the next.

A particularly stable control structure can be obtained if the active damping element 5 is combined with a reference model 7 described in the preamble which, although of little use for particularly low resonances, does have an application for higher frequency resonances. To this end, the reference model 7 is connected directly upstream of the summing point 4.3 upstream of the integral component 3.2 of the rpm regulator 3. This reference model 7 is matched to the behavior of the closed control circuit with the deactivated integral component 3.2 in the rpm regulator, so that the undesirable influence of the integral component 3.2 on the guidance behavior of the rpm regulator 3 can be eliminated, or minimized. The reference model 7 and the active damping element 5 do not interfere with each other, but complement each other advantageously.

This description was based on a rotary drive mechanism. In actual use, linear drive mechanisms are also increasingly employed, for which speed is a more suitable definition than rpm and force is a more suitable definition than torque. The control structure of the present invention can of course be employed in the same way with linear drives, because of which the terms rpm and torque are synonymous with speed and force. With machine tools with several shafts, the invention can also be employed separately for each shaft. The control structure can be realized analog as well as digitally, the present invention is of course not dependent on the type of realization.

Besides the exemplary embodiments described, it is understood that alternative variants also exist within the scope of the present invention.

We claim:

1. A control structure for the active damping of low-frequency oscillations in numerically-controlled machine tools, comprising:
    a speed regulator for generating a nominal current based on a difference between a nominal speed and an actual speed, said speed regulator comprising:
        a proportional component; and
        an integral component;
    an active damping element that forms a low-frequency correction signal, which is phase-shifted with respect to an interfering low-frequency oscillation and free of d.c. components; and
    a summing point that is upstream or downstream of said integral component and receives said low-frequency correction signal.

2. The control structure in accordance with claim 1, further comprising:
    a second integral component that corresponds to said integral component of said speed regulator, wherein said low frequency correction signal is applied to an input of said second integral component and said second integral component generates a signal at its output that is applied to a summing station located downstream of said integral component.

3. A control structure for the active damping of low-frequency oscillations in numerically-controlled machine tools, comprising:
    a speed regulator comprising:
        a proportional component; and
        an integral component;
    an active damping element that forms a low-frequency correction signal, which is phase-shifted with respect to an interfering low-frequency oscillation and free of d.c. components;
    a summing point that is upstream or downstream of said integral component and receives said low-frequency correction signal; and
    a second summing point that determines a second deviation of an actual speed from a nominal speed and said second deviation is directed to said proportional component; and wherein a first deviation of said actual speed from said a nominal speed is determined at said summing point and is directed to said integral component, and said low-frequency correction signal is applied at said summing point upstream of said integral component.

4. The control structure in accordance with claim 3, further comprising:
a position regulator that generates a nominal speed signal;
a third summing point within said damping element that receives said nominal speed signal and a derived speed signal that is derived from a nominal position value, said third summing point generates said correction signal based on a difference of said nominal speed signal and said speed derived signal.

5. The control structure in accordance with claim 4, further comprising a first order delay time member within said damping element that receives said difference between said nominal speed signal and said derived speed signal.

6. The control structure in accordance with claim 5, wherein a signal from an output of said first order delay time member is supplied to a second order delay time member.

7. The control structure in accordance with claim 6, wherein said output of said first order delay time member is supplied via a delay member to a branch of said nominal speed conducted on said integral component of said speed regulator.

8. The control structure in accordance with claim 6, wherein a damping time constant of said second order delay time member corresponds to a resonance frequency to be damped.

9. The control structure in accordance with claim 5, wherein an output of said first order delay time member is supplied via a delay member to a branch of said nominal speed conducted on said integral component of said speed regulator.

10. The control structure in accordance with claim 4, wherein said difference between said nominal speed and said derived speed is multiplied by an amplification factor.

11. The control structure in accordance with claim 3, wherein said nominal speed is conducted over a reference model of a control track prior to said determining said second deviation with said actual speed at said second summing point.

12. The control structure in accordance with claim 11, wherein said reference model of said control track is embodied as a second order delay time element, which simulates said control track and acts in a counter-phase manner.

13. A control structure for the active damping of low-frequency oscillations in numerically-controlled machine tools, comprising:

a speed regulator comprising:
a proportional component; and
an integral component;
an active damping element that forms a low-frequency correction signal, which is phase-shifted with respect to an interfering low-frequency oscillation and free of d.c. components;
a summing point that is upstream or downstream of said integral component and receives said low-frequency correction signal;
a second integral component that corresponds to said integral component of said speed regulator, wherein said low frequency correction signal is applied to an input of said second integral component and said second integral component generates a signal at its output that is applied to a summing station located downstream of said integral component;
a position regulator that generates a nominal speed signal; and
a second summing point within said damping element that receives said nominal speed signal and a derived speed signal that is derived from a nominal position value, said second summing point generates said correction signal based on a difference of said nominal speed signal and said derived speed signal.

14. The control structure in accordance with claim 13, further comprising a first order delay time member within said damping element that receives said difference between said nominal speed signal and said derived speed signal.

15. The control structure in accordance with claim 14, wherein a signal from an output of said first order delay time member is supplied to a second order delay time member.

16. The control structure in accordance with claim 15, wherein said output of said first order delay time member is supplied via a delay member to a branch of said nominal speed conducted on said integral component of said speed regulator.

17. The control structure in accordance with claim 15, wherein a damping time constant of said second order delay time member corresponds to a resonance frequency to be damped.

18. The control structure in accordance with claim 14, wherein an output of said first order delay time member is supplied via a delay member to a branch of said nominal speed conducted on said integral component of said speed regulator.

* * * * *